US012729485B2

(12) United States Patent
Kinugawa et al.

(10) Patent No.: US 12,729,485 B2
(45) Date of Patent: Sep. 8, 2026

(54) FLAME-PROOF CORRUGATED PAPERBOARD AND METHOD FOR PRODUCING SAME

(71) Applicant: RENGO CO., LTD., Osaka (JP)

(72) Inventors: Aya Kinugawa, Osaka (JP); Kengo Nozaki, Osaka (JP)

(73) Assignee: RENGO CO., LTD., Osaka (JP)

( * ) Notice: Subject to any disclaimer, the term of this patent is extended or adjusted under 35 U.S.C. 154(b) by 242 days.

(21) Appl. No.: 18/566,269

(22) PCT Filed: May 31, 2022

(86) PCT No.: PCT/JP2022/022144

§ 371 (c)(1),
(2) Date: Dec. 1, 2023

(87) PCT Pub. No.: WO2022/255367

PCT Pub. Date: Dec. 8, 2022

(65) Prior Publication Data

US 2024/0360627 A1 Oct. 31, 2024

(30) Foreign Application Priority Data

Jun. 3, 2021 (JP) ................................ 2021-093564

(51) Int. Cl.
*D21H 21/34* (2006.01)
*B32B 27/10* (2006.01)
(Continued)

(52) U.S. Cl.
CPC ............ *D21H 21/34* (2013.01); *B32B 27/10* (2013.01); *B32B 29/08* (2013.01); *D21H 19/12* (2013.01);
(Continued)

(58) Field of Classification Search
CPC .... D21H 19/12; D21H 19/824; D21H 19/828; D21H 21/34; D21H 27/40; D21H 27/18;
(Continued)

(56) References Cited

U.S. PATENT DOCUMENTS 2,986,478 A * 5/1961 Outterson ............. D21H 21/34 427/391
3,247,040 A * 4/1966 Fine ..................... B31F 1/2804 521/134

FOREIGN PATENT DOCUMENTS

CN 102619139 8/2012
CN 106676964 5/2017
(Continued)

OTHER PUBLICATIONS

Translation of JPH1060447A (bib, description and claims). (Year: 1998).*

(Continued)

*Primary Examiner* — Catherine A. Simone
(74) *Attorney, Agent, or Firm* — Wenderoth, Lind & Ponack, L.L.P.

(57) ABSTRACT

Provided are a flame-proof linerboard and a flame-proof corrugated paperboard in which with a small coating amount, a flame-proof layer is formed on the surface of a general linerboard so as to reduce penetration of the flame-proofing agent, and which are thus low in cost and exhibit high flame-proof performance. A flame-proof corrugated paperboard (21) is produced which includes, as a linerboard (15), a flame-proof paper including a paper layer (11), a flame-proof layer (12) containing a flame-proofing agent and a polymer having a molecular weight of 8,000 or more and 10,000,000 or less, and an overcoat layer (13) for protecting the flame-proof layer (12), the overcoat layer (13) being
(Continued)

disposed closer to the surface of the corrugated paperboard than the flame-proof layer (12) is.

13 Claims, 3 Drawing Sheets

(51) Int. Cl.

| | |
|---|---|
| ***B32B 29/08*** | (2006.01) |
| ***D21H 19/12*** | (2006.01) |
| ***D21H 19/82*** | (2006.01) |
| ***D21H 27/40*** | (2006.01) |

(52) U.S. Cl.
CPC ......... *D21H 19/824* (2013.01); *D21H 19/828* (2013.01); *D21H 27/40* (2013.01)

(58) Field of Classification Search
CPC .......... D21H 27/20; B32B 3/28; B32B 29/02; B32B 29/002; B32B 29/06; B32B 29/05; B32B 29/08; B32B 2317/12; B32B 2317/122; B32B 2317/127; B32B 2250/26
USPC .......................................... 428/178, 181–186
See application file for complete search history.

(56) References Cited

FOREIGN PATENT DOCUMENTS

| | | | |
|---|---|---|---|
| CN | 208411010 | | 1/2019 |
| JP | 8-133269 | | 5/1996 |
| JP | H1060447 A | * | 3/1998 |
| JP | 2000-256997 | | 9/2000 |
| JP | 2003-034004 | | 2/2003 |
| JP | 2013-091210 | | 5/2013 |
| JP | 2013-100406 | | 5/2013 |
| JP | 2015-171816 | | 10/2015 |
| JP | 2020-139233 | | 9/2020 |

OTHER PUBLICATIONS

International Preliminary Report on Patentability issued Nov. 21, 2023 in International (PCT) Application No. PCT/JP2022/022144.

* cited by examiner

FLAME-PROOF CORRUGATED PAPERBOARD AND METHOD FOR PRODUCING SAME

TECHNICAL FIELD

The present invention relates to a flame-proof corrugated paperboard, and a method for producing the corrugated paperboard.

BACKGROUND ART

In some cases, corrugated paperboard as a packaging material is required to have flame retardancy and flame-proof performance. In order to make corrugated paperboard have flame retardancy and flame-proof performance, the following methods are generally used: a method in which a flame-proofing agent such as aluminum hydroxide or silicon dioxide gel is contained in pulp to make a paper used to produce a corrugated paperboard, and a method in which a flame-proofing agent is applied to a paper having an inorganic layer such as calcium carbonate on its surface layer.

For example, Japanese Unexamined Patent Application Publication No. 2020-139233 (hereinafter, JP '233) proposes a corrugated paperboard linerboard used to produce a corrugated paperboard in which a coating film containing a flame retardant and an acrylic resin is formed on the surface of the base linerboard so as to exhibit flame retardancy.

In addition, Japanese Unexamined Patent Application Publication No. 2013-91210 (hereinafter, JP '210) proposes a linerboard in which an inorganic layer containing one of calcium carbonate, kaolin and titanium dioxide is formed on a paper layer, and a flame retardant composed of a composite compound of phosphorus and nitrogen is impregnated to a portion other than the inorganic layer, and the inorganic layer is disposed outwardly of the paper layer.

However, when a flame-proofing agent or a flame retardant is applied to the surface of the linerboard, a coating film layer containing the flame-proofing agent only on the surface of the paper tends to have weak strength. For this reason, when the linerboard coated with the flame-proofing agent only is used to produce a corrugated paperboard, the coating film layer, i.e., the flame-proof agent could be separated by heat or friction. In order to prevent this separation, Japanese Unexamined Patent Application Publication No. H08-133269 proposes a method in which a material such as a plastic film is laminated onto the coating film layer so as to protect the coating film layer.

However, the method in which a flame-proofing agent is contained in pulp to make a paper has a problem in that this method is not suitable for production of a small lot because if this method is used, a large amount of paper is manufactured by a paper machine. On the other hand, in the method of JP '233, in which a flame retardant is applied to the surface of the linerboard, in order to prevent the flame retardant applied from penetrating into the linerboard, and form a coating film on the surface of the linerboard, a large amount of a relatively flammable acrylic resin having an oxygen index (OI: JIS K7201-2) of about 18, which is an index of flame retardancy, is required, and thus there is a problem in flame-proof performance.

In addition, by, as in the method of JP '210, forming an inorganic layer on the surface of a paper layer and applying a flame retardant thereon, it is possible to prevent the flame retardant from infiltrating into the paper, but for this purpose, it is necessary to form the inorganic layer to the entire surface of the paper. This complicates the production process, and generates a problem of cost.

Therefore, it is an object of the present invention to provide a flame-proof linerboard and a flame-proof corrugated paperboard in which, using a general linerboard and a method of applying a flame-proofing agent by coating, a flame-proof layer is formed, with a small coating amount, on the surface of the general linerboard so as to reduce penetration of the flame-proofing agent, and which are thus low in cost and exhibit high flame-proof performance.

SUMMARY OF THE INVENTION

In order to achieve the above object, the present invention provides a flame-proof corrugated paperboard comprising, as a linerboard, a flame-proof paper including: a paper layer; a flame-proof layer containing a flame-proofing agent and a polymer having a molecular weight of 8,000 or more and 10,000,000 or less; and an overcoat layer for protecting the flame-proof layer, the overcoat layer being disposed closer to a surface of the flame-proof corrugated paperboard than the flame-proof layer is.

Since the flame-proof layer containing a flame-proofing agent contains the above polymer, the coating film is easily formed, so that this improves the strength of the coating film forming the flame-proof layer, and reduces penetration of the flame-proofing agent into a deep portion from the surface of the paper layer. Due to this, the flame-proof layer can be formed with a small coating amount without providing an inorganic layer as in JP '210. That is, this structure simplifies the production process, reduces the cost for forming the flame-proof layer, and ensures high flame-proof performance.

A water-soluble polymer can be suitably used as the above polymer. Water-soluble salts often used as flame-proofing agents of paper, wood, etc. aggregate when mixed with an emulsion of a water-insoluble polymer, and uniformity is lost. However, a coating liquid in which such a water-soluble salt is mixed with a water-soluble polymer does not aggregate, and easily forms a flame-proof layer having high uniformity when applied.

Accordingly, a water-soluble salt can be suitably used as the flame-proofing agent.

In addition, since the overcoat layer is disposed closer to the surface of the corrugated paperboard than the flame-proof layer is, the flame-proof layer is not separated even when the flame-proof paper is heated or subjected to friction during the production of the corrugated paperboard including the flame-proof paper as its linerboard, and thus the corrugated paperboard maintains its flame-proof performance.

As a method for producing the linerboard used for flame-proof corrugated paperboard according to the present invention, a method can be used which comprises applying to one surface of a paper layer of the flame-proof linerboard a coating liquid containing a flame-proofing agent and a polymer having a molecular weight of 8,000 or more and 10,000,000 or less, thereby forming a flame-proof layer; and applying an overcoat agent to a surface of the flame-proof layer on a side of the flame-proof layer opposite from the paper layer, thereby forming an overcoat layer. The coating liquid containing a flame-proofing agent preferably has a viscosity of 20 mPa·s or more and 1,900 mPa·s or less because a flame-proof layer is easily formed.

By using the present invention, it is possible to obtain a flame-proof corrugated paperboard including a linerboard which exhibits high flame-proof performance on the linerboard surface while reducing the amount of a flame-proofing agent required.

DETAILED DESCRIPTION OF THE INVENTION

Figure 1:
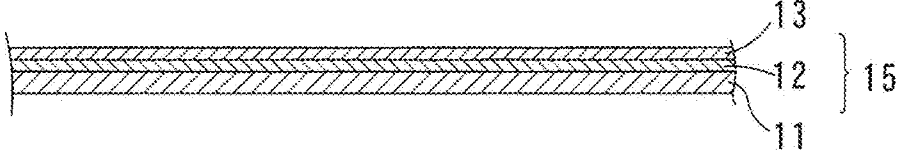
FIG. 1 is a sectional view of the flame-proof linerboard used in a flame-proof corrugated paperboard embodying the present invention.
Figure 2:
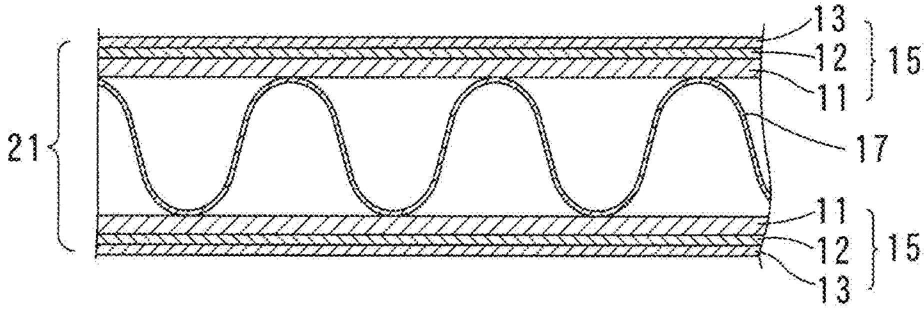
FIG. 2 is a sectional view of the flame-proof corrugated paperboard embodying the present invention.

The present invention will be described below in detail with reference to embodiments. The present invention is directed to a corrugated paperboard having flame-proof performance. FIG. 1 shows a sectional view of a linerboard 15 used in a corrugated paperboard embodying the present invention, and FIG. 2 shows a sectional view of the corrugated paperboard.

The linerboard 15 includes a paper layer 11, a flame-proof layer 12 containing a flame-proofing agent and a polymer having a molecular weight of 8,000 or more and 10,000,000 or less, and an overcoat layer 13 for protecting the flame-proof layer 12. Basically, the flame-proof layer 12 is disposed on the side of a surface of the corrugated paperboard (hereinafter simply referred to as the "surface side") so as to be kept in contact with the paper layer 11, and the overcoat layer 13 is disposed on the surface side so as to be kept in contact with the flame-proof layer 12. The present invention is achievable even if a different layer is disposed between these layers. However, since the closer the flame-proof layer 12 is located to a flame or a heat source from the surface side, the more likely the flame-proof layer 12 is to exhibit its flame-proof performance, it is desirable that a different layer is not disposed between the flame-proof layer 12 and the overcoat layer 13.

As the paper layer 11, a general linerboard can be used. While a linerboard having an inorganic layer on its surface can also be used, since, in the present invention, the flame-proof layer 12 reduces penetration into the paper layer 11, even a general linerboard is suitably usable which is especially not subjected to surface treatment for, e.g., providing an inorganic layer. Such a general linerboard is desirable in terms of easy availability and cost, too.

The flame-proof layer 12 contains the flame-proofing agent and the polymer, and uniformly covers the entire surface of the paper layer 11 on one side thereof so as to exhibit its flame-proof performance. As the flame-proofing agent contained in the flame-proof layer 12, for example, a phosphorus compound, a halogen compound or a metal hydroxide can be used. Among them, use of especially a water-soluble salt is preferable because a water-soluble salt is easily mixed as an aqueous solution of the flame-proofing agent when mixed with a water-soluble polymer described later to prepare a coating liquid. Examples of the flame-proofing agent which is a water-soluble salt include, e.g., phosphorus-nitrogen compounds such as ammonium polyphosphate and polyphosphoric acid amide, guanidine salts such as guanidine sulfamate and guanidine phosphate, halogen compounds such as ammonium bromide and ammonium chloride, boric acid compounds such as borax and sodium borate, and inorganic salts such as ammonium sulfate. The flame-proofing agent having water solubility refers to an agent in which solubility with respect to 100 g of water is 1 g or more, and preferably 10 g or more.

As the polymer contained in the flame-proof layer 12, a polymer is usable which can be dispersed or dissolved in water, and can form a film on the surface of the paper layer 11 by drying. Among them, use of especially a water-soluble polymer that can be dissolved in water is preferable because even when the water-soluble polymer is mixed with the flame-proofing agent, the water-soluble polymer can be applied while being uniformly dissolved without being aggregated by the flame-proofing agent, and this facilitates formation of the flame-proof layer 12 having high uniformity. The water-soluble polymer, which has water solubility, refers to a polymer in which the solubility with respect to 100 g of water is 0.2 g or more, and preferably 6 g or more. The water-soluble polymer is preferably a polymer having a relatively large oxygen index (OI) of 20 or more, and may be, e.g., a homopolymer such as polyvinyl alcohol (OI=about 22), polyacrylamide (OI=about 27) or polyvinylpyrrolidone (OI=21); or a copolymer containing monomers forming such homopolymers.

The polymer has, as a weight average molecular weight, a molecular weight of preferably 8,000 or more, and more preferably 30,000 or more. If a polymer having a molecular weight of less than 8,000 is used, it is difficult to achieve an appropriate concentration that is easy to coat, and the penetration of the flame-proofing agent into the paper layer 11 cannot be ignored, so that it is difficult to form the flame-proof layer 12. On the other hand, the polymer has a weight average molecular weight of preferably 10,000,000 or less, and more preferably 8,000,000 or less. If it exceeds 10,000,000, the solubility in water is significantly reduced, and the polymer concentration in the coating liquid cannot be increased. As a result, it is difficult to prevent the penetration into the paper layer 11, and thus the flame-proof performance deteriorates. The number average molecular weight generally shows a value equal to or less than the weight average molecular weight. Therefore, when the number average molecular weight is 8,000 or more, the above lower limit condition is satisfied. On the other hand, the viscosity average molecular weight shows an intermediate value between the number average molecular weight and the weight average molecular weight, though this depends on the molecular weight distribution of the polymer. Therefore, when the number average molecular weight or the viscosity average molecular weight is 10,000,000 or less, the above upper limit condition is substantially satisfied.

With respect to the flame-proofing agent and the polymer that are contained in the flame-proof layer 12, the mixing ratio of the flame-proofing agent to the polymer is preferably 0.5 times or more and 10 times or less. If the mixing ratio is less than 0.5 times, it is difficult to exhibit the flame-proof performance. On the other hand, if the mixing ratio exceeds 10 times, the strength of the coating film is reduced, so that the flame-proofing agent could fall off.

The flame-proof layer 12 is formed by applying to one surface of the paper layer 11 the coating liquid containing the flame-proofing agent and the polymer. The viscosity of the coating liquid is adjusted by the concentration in the coating liquid according to the molecular weight of the polymer used, and is preferably 20 mPa·s or more, and more preferably 30 mPa·s or more as a value measured at 20° C. by a B-type viscometer manufactured by Toki Sangyo Co., Ltd. If the viscosity is less than 20 mPa·s, the viscosity is too low, and the amount of the flame-proofing agent penetrating into the paper layer 11 during coating is too large, so that a larger amount of the coating liquid is required for making a sufficient amount of the flame-proofing agent remain on the surface. On the other hand, the viscosity of the coating liquid is preferably 1,900 mPa·s or less, and more preferably 1,800 mPa's or less. If the viscosity exceeds 1,900 mPa·s, the viscosity is too high, and it is difficult to form a uniformly coated layer.

Examples of the method of applying the coating liquid onto the surface of the paper layer 11 to form the flame-proof layer 12 include, e.g., a gravure coater, a roll coater, a bar coater and a die coater. Among them, a direct gravure coater or a reverse gravure coater is preferable as a gravure coater. Even if the coating liquid is directly applied to the paper layer 11, since the molecular weight of the polymer and the viscosity of the coating liquid are adjusted to the above ranges, a layer of the flame-proofing agent is easily formed on the surface of the paper layer 11 while reducing the penetration into the paper layer 11, so that sufficient flame-proof performance can be obtained. Coating with especially a gravure coater is also suitable for production in a small lot using a gravure printing machine.

Since the flame-proof layer 12 is formed as a film containing the polymer, it is possible to reduce separation of the layer 12 during coating. In addition to this, since the overcoat layer 13 is disposed on the flame-proof layer 12, it is possible to reduce separation of the flame-proofing agent from the surface while forming the linerboard on the corrugated paperboard. Therefore, it is possible to improve the heat and wear resistance.

The applied amount of the flame-proofing agent contained in the flame-proof layer 12 is preferably 0.2 $g/m^2$ or more, and more preferably 0.7 $g/m^2$ or more in solid content. If the applied amount is less than 0.2 $g/m^2$, the amount of the flame-proofing agent is too small, so that the flame-proof layer 12 could fail to exhibit sufficient flame-proof performance. On the other hand, the applied amount is preferably 20.0 $g/m^2$ or less, and more preferably 5.0 $g/m^2$ or less. Even if the applied amount exceeding 20.0 $g/m^2$ is used, improvement in the flame-proof performance cannot be expected as much as the added amount, and it is impossible to make the most of it.

The linerboard 15, which partially constitutes the flame-proof corrugated paperboard 21 of the present invention, includes the overcoat layer 13 on the surface of the flame-proof layer 12 on its side (upper side in FIG. 1) opposite from (i.e., remoter from) the paper layer 11. The overcoat layer 13 prevents separation and wear of the flame-proof layer 12, and protects the flame-proof layer 12 so that the flame-proof layer 12 continuously exhibits its flame-proof performance even after, e.g., heating while machining the corrugated paperboard. The overcoat layer 13 needs to uniformly cover the entire flame-proof layer 12 so as to protect the flame-proof layer 12. The overcoat layer 13 is formed by forming the flame-proof layer 12, and then applying an overcoat agent thereon. As the overcoat agent, a varnish, or the combination of a varnish and an additive can be used. The type of varnish used may be, for example, a nitrocellulose-based or acrylic-based one, but is not particularly limited, because the flame-proof layer 12, which has excellent flame-proof performance, is formed on the paper layer 11, and thus the flame-proof performance is not affected. That is, any varnish may be used if the varnish exhibits wear resistance to such an extent that the varnish is not easily peeled off in a general corrugated paperboard production process and use process.

The applied amount of the overcoat agent is preferably 0.4 $g/m^2$ or more and 18.0 $g/m^2$ or less in solid content. If the applied amount is 0.4 $g/m^2$ or less, it is difficult to sufficiently protect the flame-proof layer 12. On the other hand, if the applied amount is 18.0 $g/m^2$ or more, the flame-proof performance could deteriorate, coating is difficult, and there is a problem in terms of cost, too.

The overcoat layer 13 may contain an inorganic substance as the above-mentioned additive in addition to the above-mentioned varnish. As compared to the overcoat layer 13 formed of only the varnish, the overcoat layer 13 containing the inorganic substance exhibits even higher flame-proof performance. Examples of the inorganic substance contained include oxides and metal compounds such as calcium carbonate, kaolin, silicon dioxide and titanium dioxide.

The content of the inorganic substance in the overcoat layer 13 is preferably 3% by mass or more. If the content is less than 3% by mass, the effect of improving the flame-proof performance is small, and even if the inorganic substance is added, the flame-proof performance is not improved. On the other hand, the content of the inorganic substance is preferably 35% by mass or less. If the content exceeds 35% by mass, the inorganic substance is likely to be precipitated in the coating liquid, so that a uniform overcoat layer may not be formed, or the inorganic substance may fall off from the overcoat layer.

The linerboard 15, which includes, on the paper layer 11, the above-described flame-proof layer 12 and overcoat layer 13 in this order, is a flame-proof linerboard that sufficiently exhibits its flame-proof performance against a flame or a heat source from the side of the overcoat layer 13. By using the linerboard 15 as at least one of a front linerboard and a rear linerboard, the at least one linerboard exhibits its flame-proof performance against a flame or a heat source from the direction in which the at least one linerboard is used. Especially if linerboards 15 as described above are used as the front linerboard and the rear linerboard, respectively, a flame-proof corrugated paperboard is obtainable which exhibits flame-proof performance equivalent to the flame-proof standard acceptance (45° Meckel burner method, such as a disaster partition) defined by the Japan Fire Retardant Association.

Further, the flame-proof corrugated paperboard 21 in which linerboards 15 as described above are used, respectively, as the front linerboard and the rear linerboard exhibits sufficient flame-proof performance, and thus a special flame-proof treatment to its corrugated medium 17 is not required. Also, since each linerboard 15 includes the overcoat layer 13, the flame-proof layer 12 is also protected from a load such as heat or friction applied in a normal production process of corrugated paperboard, and thus, the flame-proof performance is continuously exhibited. For this reason, the flame-proof corrugated paperboard according to the present invention can be produced by a method similar to that of general corrugated paperboard, but exhibits sufficient flame-proof performance.

The flame-proof corrugated paperboard according to the present invention can be used not only for applications such as building material panels, display panels, and partitions, but also for transport boxes and storage boxes for specific articles that are required to have flame-proof performance by taking advantage of its sufficient flame-proof performance.

EXAMPLES

Next, the flame-proof corrugated paperboard according to the present invention will be described more specifically with reference to examples in which the present invention is actually used. First, e.g., materials used will be enumerated.

Flame-Proofing Agent

Phosphorus-nitrogen flame-proofing agent: NONNEN R061-3 (aqueous solution: active ingredient=40%), produced by Marubishi Oil Chemical Co., Ltd.

Guanidine flame-proofing agent: Plasafety SC-1000 (solid: guanidine sulfamate content≥90%), produced by Manac Incorporated.

Halogen flame-proofing agent: ammonium bromide: special grade reagent, produced by FUJIFILM Wako Pure Chemical Corporation

Water-Soluble Polymer

Polyacrylamide 1: product code 555-77731, viscosity average molecular weight 5,000,000 to 6,000,000, produced by FUJIFILM Wako Pure Chemical Corporation Polyacrylamide 2: product code 738743, number average molecular weight 40,000, produced by Sigma-Aldrich Japan Polyacrylamide 3: Helios Floc HA-825, viscosity average molecular weight 11,000,000, produced by Helios K.K.

Polyvinyl alcohol 1: JF-02, average polymerization degree 200 (viscosity average molecular weight 9,000), produced by JAPAN VAM & POVAL CO., LTD.

Polyvinyl alcohol 2: JF-10, average polymerization degree 1,000 (viscosity average molecular weight 44,000), produced by JAPAN VAM & POVAL CO., LTD.

Overcoat Agent

Varnish 1: Gratone PCN (nitrocellulose-based), produced by SAKATA INX CORPORATION Varnish 2: New FK MR OP varnish N-2000 (acrylic-based), produced by SAKATA INX CORPORATION

Inorganic Substance for Overcoat Agent

Silicon dioxide: special grade reagent, produced by FUJIFILM Wako Pure Chemical Corporation Calcium carbonate: special grade reagent, produced by FUJIFILM Wako Pure Chemical Corporation Titanium dioxide: titanium oxide "production only", produced by FUJIFILM Wako Pure Chemical Corporation

Linerboard

General linerboard: RKA170, produced by Rengo Co., Ltd.

Inorganic layer-containing linerboard: CRC230, produced by Rengo Co., Ltd.

Verification of Coatability by Viscosity

Example 1

A coating liquid as a flame-proofing agent aqueous solution was prepared by mixing together a phosphorus-nitrogen flame-proofing agent, polyacrylamide 1 and water such that the phosphorus-nitrogen flame-proofing agent is 28% by mass, the polyacrylamide 1 is 6% by mass, and the water is 66% by mass. The coating liquid had a viscosity of 30 mPa·s. By applying the coating liquid to a general linerboard surface constituting the front surface of a corrugated paperboard with a bar coater (Select-Roller manufactured by OSG SYSTEM PRODUCTS CO., LTD.) such that the applied amount would be 3.4 g/m$^2$, a flame proof-layer was formed. After drying the flame-proof layer, by applying varnish 1 as an overcoat agent onto the flame-proof layer with the bar coater such that the applied amount would be 2.0 g/m$^2$, an overcoat layer was formed, so that a flame-proof linerboard was produced. The overcoat layer formed was a uniform and even layer in appearance. Using thus-formed flame-proof linerboards, respectively, as front and rear linerboards, a general corrugated medium (manufactured by Rengo Co., Ltd.: S120) formed into a wave shape with a test fluter (manufactured by Nihon T.M.C. Corporation) was bonded with starch adhesive to form a A-flute corrugated paperboard, and the flame-proof performance was evaluated. The flame-proof performance was tested in accordance with the 45° Meckel burner method by the Japan Fire Retardant Association, and determined according to the following criteria.

○ means "passed residual flame time (10 seconds or less) and afterglow time (30 seconds or less)", Δ means "passed either one of residual flame time and afterglow time", and x means "failed both of residual flame time and afterglow time".

Figure 3A:
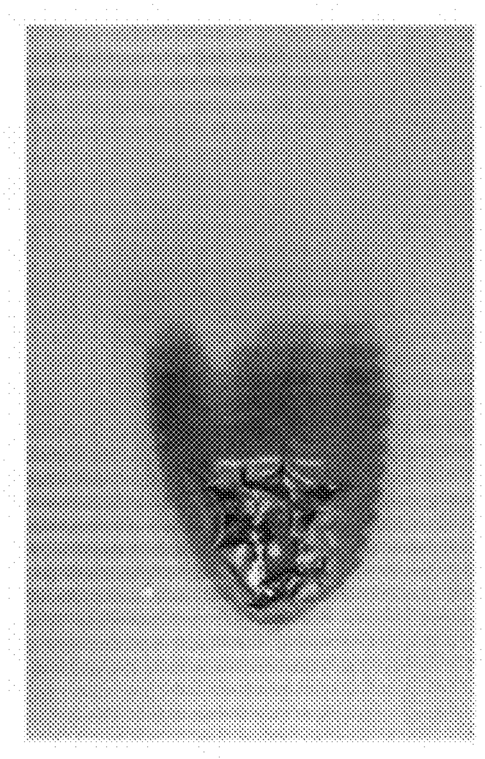
FIG. 3A is a photograph showing a result of a flame-proofing test in Example 1.

According to the above determination criteria, Example 1 was determined as "passed (○)". FIG. 3A shows a surface photograph after the flame-proof test in which the flame-proof performance was measured.

TABLE 1

| Content | | | Example/Comparative Example Number | | | | |
|---|---|---|---|---|---|---|---|
| | | | Example 1 Reference | Example 2 Low molecular weight PAM | Comparative Example 1 High molecular weight PAM | Comparative Example 2 Flame-proofing agent only | Example 3 Type of flame-proofing agent |
| Linerboard | | | RKA170 | ← | ← | ← | ← |
| Flame-proofing agent | Flame-proofing agent | Phosphorus-nitrogen compound | 28% by mass | ← | ← | ← | |
| | | Guanidine compound | | | | | 28% by mass |
| | | Halogen compound | | | | | |

TABLE 1-continued

| | | | | | | | |
|---|---|---|---|---|---|---|---|
| | Water-soluble polymer | PAM1 (medium molecular weight) | 6% by mass | | | | 6% by mass |
| | | PAM2 (low molecular weight) | | 6% by mass | | | |
| | | PAM3 (high molecular weight) | | | 0.2% by mass | | |
| | Water | | 66% by mass | ← | 71.8% by mass | 72% by mass | 66% by mass |
| | Viscosity of coating liquid (mPa · s) | | 30 | 25 | — | 7 | 30 |
| | Coating method | | Bar coater | ← | ← | ← | ← |
| | Applied amount (solid content g/m$^2$) | | 3.4 (Flame-proofing agent = 2.8, polymer = 0.6) | ← | 2.82 (Flame-proofing agent = 2.8, polymer = 0.02) | 2.8 | ← |
| Overcoat agent | Varnish | Varnish 1 (nitrocellulose-based) | 100% by mass | ← | ← | ← | ← |
| | Applied amount (solid content: g/m$^2$) | | 2.0 | ← | ← | ← | ← |
| Flame-proof performance | | Without heat friction | ○ | ○ | X | X | ○ |

| Content | | | Example/Comparative Example Number | | | |
|---|---|---|---|---|---|---|
| | | | Example 4 Type of flame-proofing agent | Example 5 Applied amount of flame-proofing agent | Example 6 Applied amount of flame-proofing agent | Example 7 Applied amount of flame-proofing agent |
| Linerboard | | | ← | ← | ← | ← |
| Flame-proofing agent | Flame-proofing agent | Phosphorus-nitrogen compound | | 28% by mass | ← | ← |
| | | Guanidine compound | | | | |
| | | Halogen compound | 28% by mass | | | |
| | Water-soluble polymer | PAM1 (medium molecular weight) | ← | ← | ← | ← |
| | | PAM2 (low molecular weight) | | | | |
| | | PAM3 (high molecular weight) | | | | |
| | Water | | ← | ← | ← | ← |
| | Viscosity of coating liquid (mPa · s) | | 30 | 30 | ← | ← |
| | Coating method | | ← | ← | ← | ← |
| | Applied amount (solid content g/m$^2$) | | ← | 0.34 (Flame-proofing agent = 0.28, polymer = 0.06) | 0.85 (Flame-proofing agent = 0.7, polymer = 0.15) | 24.1 (Flame-proofing agent = 19.8, polymer = 4.3) |
| Overcoat agent | Varnish | Varnish 1 (nitrocellulose-based) | ← | ← | ← | ← |
| | Applied amount (solid content: g/m$^2$) | | ← | ← | ← | ← |
| Flame-proof performance | | Without heat friction | ○ | Δ | ○ | ○ |

Verification of Molecular Weight of Water-Soluble Polymer

Example 2

Figure 3B:
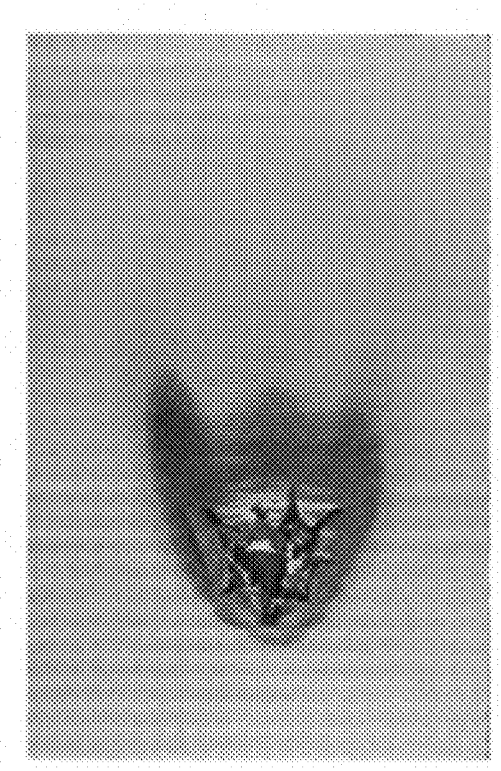
FIG. 3B is a photograph showing a result of a flame-proofing test in Example 2.

A flame-proof corrugated paperboard was prepared in the same manner as in Example 1 except that the viscosity of the coating liquid was 25 mPa·s by changing the water-soluble polymer used to polyacrylamide 2, which has a different molecular weight. As a result, the determination was ○. FIG. 3B shows a surface photograph after the flame-proof test in which the flame-proof performance was measured.

Comparative Example 1

A flame-proof corrugated paperboard was prepared in the same manner as in Example 1 except that by changing the water-soluble polymer used to polyacrylamide 3, which has a different molecular weight, the solubility in water was remarkably small and the concentration of the water-soluble polymer in the flame-proofing agent aqueous solution was 0.2% by mass. As a result, the flame-proofing agent aqueous solution infiltrated into the paper layer, and a sufficient flame-proof layer was not obtained.

Comparative Example 2

Figure 3C:
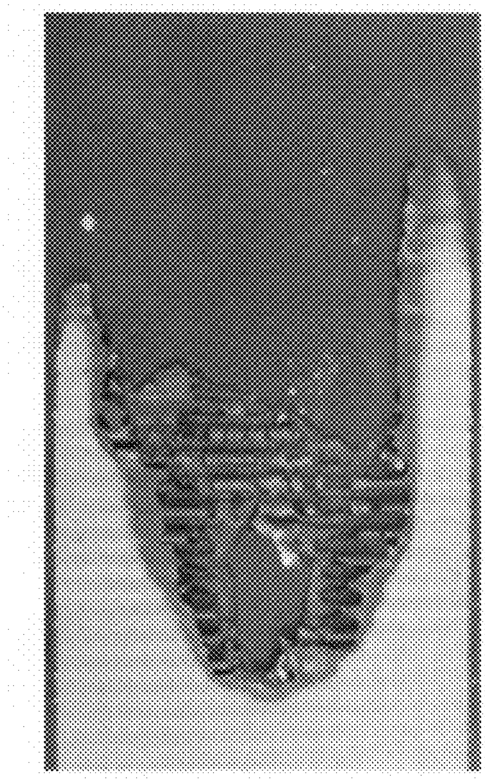
FIG. 3C is a photograph showing a result of a flame-proofing test in Comparative Example 2.

A flame-proof corrugated paperboard was prepared in the same manner as in Example 1 except that polyacrylamide was excluded from the flame-proofing agent aqueous solution to adjust the viscosity to 7 mPa·s. As a result, the flame-proof performance was x, and most of the flame-proof corrugated paperboard was burned. A surface photograph of Comparative Example 2 is shown in FIG. 3C. It is considered that this occurred because the water-soluble polymer was not added to the flame-proofing agent aqueous solution, the viscosity decreased, most of the flame-proofing agent aqueous solution was absorbed into the linerboard, and a flame-proof layer was not formed on the surface.

Verification of Type of Flame-Proofing Agent

Examples 3 and 4

In each of Examples 3 and 4, a flame-proof corrugated paperboard was prepared in the same manner as in Example 1 except that the flame-proofing agent was changed to a guanidine flame-proofing agent (Example 3), or a halogen flame-proofing agent (Example 4), and the viscosity of the coating liquid was 30 mPa·s by adding water for dissolution such that the concentration of the agent in the flame-proofing agent aqueous solution would be the same as that of Example 1 since the agent was provided in the form of a solid or a powder. The flame-proof performance in each of Examples 3 and 4 was determined as ○.

Adjustment of Applied Amount

Examples 5 to 7

In each of Examples 5 to 7, a flame-proof corrugated paperboard was prepared in the same manner as in Example 1 except that the applied amount of the flame-proofing agent was changed to 0.28 g/m$^2$ (Example 5); 0.7 g/m$^2$ (Example 6) or 19.8 g/m$^2$ (Example 7). As a result of determining the flame-proof performance of each corrugated paperboard prepared, Example 5, in which the applied amount of the flame-proofing agent was small, was Δ, but Examples 6 and 7 were ○. This shows that as the applied amount of the flame-proofing agent increase, the flame-proof performance improves.

Type of Water-Soluble Polymer

Examples 8 and 9

In each of Examples 8 and 9, a flame-proof corrugated paperboard was prepared in the same manner as in Example 1 except that the viscosity of the coating liquid was 30 mPa·s (Example 8) or 80 mPa·s (Example 9) by changing the polymer used from polyacrylamide 1 to polyvinyl alcohol 1 (Example 8) or polyvinyl alcohol 2 (Example 9). The flame-proof performance of each corrugated paperboard prepared was determined as ○. It was confirmed that even if the type of the polymer used is changed under the condition that it is a water-soluble polymer, the flame-proof corrugated paperboard according to the present invention can be produced.

TABLE 2

| Content | | | Example 8 Type of polymer | Example 9 Type of polymer | Example 10 Mixing ratio of polymer | Comparative Example 3 Mixing ratio of polymer | Example 11 Type of varnish |
|---|---|---|---|---|---|---|---|
| | | | Example/Comparative Example Number | | | | |
| | Linerboard | | RKA170 | ← | ← | ← | ← |
| Flame-proofing agent | Flame-proofing agent | Phosphorus-nitrogen compound | 28% by mass | ← | ← | ← | ← |
| | Water-soluble polymer | PAM1 (medium molecular weight) | | | 15% by mass | 17% by mass | 6% by mass |
| | | PVA1 (low molecular weight) | 6% by mass | | | | |
| | | PVA2 (high molecular weight) | | 6% by mass | | | |
| | Water | | 66% by mass | | 57% by mass | 55% by mass | 66% by mass |
| | Viscosity of coating liquid | | 30 | 80 | 1,800 | 2,000 | 30 |
| | Coating method | | Bar coater | ← | Gravure printing machine | ← | Bar coater |
| | Applied amount (solid content g/m$^2$) | | 3.4 (Flame-proofing agent = 2.8, polymer = 0.6) | ← | 4.3 (Flame-proofing agent = 2.8, polymer = 1.5) | 4.5 (Flame-proofing agent = 2.8, polymer = 1.7) | 3.4 (Flame-proofing agent = 2.8, polymer = 0.6) |
| Overcoat agent | Varnish | Varnish 1 (nitrocellulose-based) | 100% by mass | ← | ← | ← | |
| | | Varnish 2 (acrylic) | | | | | 100% by mass |
| | Applied amount (solid content g/m$^2$) | | 2.0 | ← | ← | ← | ← |
| Flame-proof performance | | Without heat friction | ○ | ○ | ○ | — (Flame-proof layer was non-uniform and could not be evaluated) | ○ |
| | | With heat friction | | | | | |

TABLE 2-continued

| Content | | | Example 12 Applied amount of varnish | Example 13 Applied amount of varnish | Comparative Example 4 No varnish | Comparative Example 5 Excessive applied amount of varnish |
|---|---|---|---|---|---|---|
| Linerboard | | | ← | ← | ← | ← |
| Flame-proofing agent | Flame-proofing agent | Phosphorus-nitrogen compound | ← | ← | ← | ← |
| | Water-soluble polymer | PAM1 (medium molecular weight) | ← | ← | ← | ← |
| | | PVA1 (low molecular weight) | | | | |
| | | PVA2 (high molecular weight) | | | | |
| | Water | | ← | ← | ← | ← |
| | Viscosity of coating liquid | | ← | ← | ← | ← |
| | Coating method | | ← | ← | ← | ← |
| | Applied amount (solid content g/m$^2$) | | ← | ← | ← | ← |
| Overcoat agent | Varnish | Varnish 1 (nitrocellulose-based) | 100% by mass | ← | | 100% by mass |
| | | Varnish 2 (acrylic) | | | | |
| | Applied amount (solid content g/m$^2$) | | 0.5 | 15.0 | | 20.0 |
| Flame-proof performance | | Without heat friction | ○ | ○ | ○ | Δ |
| | | With heat friction | ○ | ○ | Δ | Δ |

Adjustment of Mixing Ratio of Flame-Proofing Agent and Water-Soluble Polymer

Example 10

When the mixing ratio of polyacrylamide 1 was changed to 15% by mass in Example 1, the viscosity of the flame-proofing agent aqueous solution was 1,800 mPa·s, but a uniform flame-proof layer was obtained by coating at a coating speed of 80 m/min using a gravure printing machine. The flame-proof performance of a flame-proof corrugated paperboard prepared using this linerboard was determined as ○.

Comparative Example 3

When the mixing ratio of polyacrylamide 1 was changed to 17% by mass in Example 10, the viscosity of the flame-proofing agent aqueous solution was 2,000 mPa·s, and a uniform flame-proof layer was not obtained. Therefore, it was not possible to prepare a flame-proof corrugated paperboard, and determine the flame-proof performance.

Type of Varnish of Overcoat Layer

Example 11

A flame-proof corrugated paperboard was prepared in the same manner as in Example 1 except that instead of varnish 1 (nitrocellulose-based), varnish 2 (acrylic-based) was used to form an overcoat layer. The flame-proof performance was determined as ○. It was confirmed that even if the type of varnish of the overcoat layer is changed, the flame-proof corrugated paperboard according to the present invention can be produced.

Adjustment of Amount Applied to Overcoat Layer

Examples 12 and 13

In each of Examples 12 and 13, a flame-proof corrugated paperboard was prepared in the same manner as in Example 1 except that the applied amount of varnish 1 for forming an overcoat layer was changed to 0.5 g/m$^2$ (Example 12) or 15.0 g/m$^2$ (Example 13). The flame-proof performance of each corrugated paperboard prepared was ○, and the flame-proof performance was not lost in the production stage of the corrugated paperboard.

Comparative Example 4

A flame-proof linerboard was prepared in the same manner as in Example 1 except that no overcoat layer was formed. This linerboard was placed in a color fastness rubbing tester (AB-301 manufactured by TESTER SANGYO CO., LTD.), and rubbed for 30 minutes under the conditions of a heating plate temperature of 180° C., a load of 500 gf, and a reciprocating speed of 30 cpm. Thereafter, a corrugated paperboard of A flute was prepared in the same manner, and the flame-proof performance was evaluated. As a result, the flame-proof performance of a portion of the corrugated paperboard that was not subjected to friction was determined as ○, but the flame-proof performance of a portion of the corrugated paperboard that was subjected to friction was determined as Δ.

Comparative Example 5

A flame-proof linerboard was prepared in the same manner as in Example 1 except that the applied amount of varnish 1 for forming an overcoat layer was changed to 20.0 g/m$^2$. After conducting a wear test on this linerboard in the same manner as in Comparative Example 4, a flame-proof corrugated paperboard was prepared using the linerboard, and the flame-proof performance was evaluated. As a result, the flame-proof performance of both a portion of the corrugated paperboard that was not subjected to friction and a portion thereof that was subjected to friction was determined as Δ.

Adjustment of Amount of Inorganic Substance in Overcoat Layer

Examples 14 and 15, Comparative Example 6

Figure 3D:
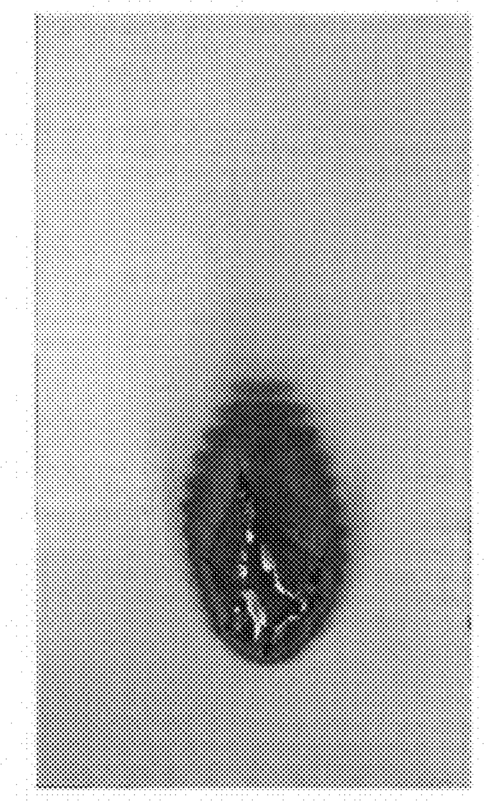
FIG. 3D is a photograph showing a result of a flame-proof test in Example 14.

In each of Examples 14 and 15 and Comparative Example 6, a flame-proof corrugated paperboard was prepared in the same manner as in Example 1 except that the overcoat agent contained silicon dioxide in an amount of 5% by mass (Example 14), 25% by mass (Example 15), or 30% by mass (Comparative Example 6). In each of Examples 14 and 15, both the residual flame time and the afterglow time were shortened although ○ in the determination criterion, and flame-proof performance higher than that of the corrugated paperboard in Example 1 was exhibited. However, as a result of confirming dispersion stability by allowing the overcoat agent containing the inorganic substance to stand at room temperature for 1 day, no particular change was observed in Examples 14 and 15, but most of the inorganic substance was precipitated in Comparative Example 6. FIG. 3D shows a surface photograph of Example 14 after the flame-proof test.

TABLE 3

| Content | | | Example/Comparative Example Number | | | | | |
|---|---|---|---|---|---|---|---|---|
| | | | Example 14 Blending amount of inorganic substance | Example 15 Blending amount of inorganic substance | Comparative Example 6 Excessive blending amount of inorganic substance | Example 16 Type of inorganic substance | Example 17 Type of inorganic substance | Example 18 Type of linerboard |
| Linerboard | | | RKA170 | ← | ← | ← | ← | CRC230 |
| Flame-proofing agent | Flame-proofing agent | Phosphorus-nitrogen compound | 28% by mass | ← | ← | ← | ← | ← |
| | Water-soluble polymer | PAM1 (medium molecular weight) | 6% by mass | ← | ← | ← | ← | ← |
| | Water | | 66% by mass | ← | ← | ← | ← | ← |
| | Viscosity of coating liquid (mPa · s) | | 30 | ← | ← | ← | ← | ← |
| | Coating method | | Bar coater | ← | ← | ← | ← | ← |
| | Applied amount (solid content: g/m$^2$) | | 3.4 (Flame-proofing agent = 2.8, polymer = 0.6) | ← | ← | ← | ← | ← |
| Overcoat agent | Varnish | Varnish 1 (nitrocellulose-based) | 95% by mass | 75% by mass | 70% by mass | 95% by mass | ← | 100% by mass |
| | Inorganic substance | Silicon dioxide | 5% by mass | 25% by mass | 30% by mass | | | |
| | | Calcium carbonate | | | | 5% by mass | | |
| | | Titanium dioxide | | | | | 5% by mass | |
| | Dispersion stability of inorganic substance | | ○ | ○ | X | ○ | ○ | — |
| | Applied amount (solid content: g/m$^2$) | | 2.0 | ← | ← | ← | ← | ← |
| Flame-proof performance | | Without heat friction | ○ | ○ | — (Overcoat layer could not be formed, and was unevaluated) | ○ | ○ | ○ |

Adjustment of Type of Inorganic Substance in Overcoat Layer

Examples 16 and 17

In each of Examples 16 and 17, a flame-proof corrugated paperboard was prepared in the same manner as in Example 14 except that the type of the inorganic substance used was changed from silicon dioxide to calcium carbonate (Example 16) or titanium dioxide (Example 17). In each of Examples 16 and 17, there was no problem in the dispersion stability of the inorganic substance, and the result of the flame-proof test was also ○, and good flame-proof performance was exhibited.

Change of Linerboard

Example 18

A flame-proof corrugated paperboard was prepared in the same manner as in Example 1 except that instead of the general linerboard, an inorganic layer-containing linerboard was used. Such a different linerboard was used, but the result of the flame-proof test was ○, and good flame-proof performance was exhibited.

DESCRIPTION OF REFERENCE NUMERALS

11: Paper layer
12: Flame-proof layer
13: Overcoat layer
15: Flame-proof linerboard
17: Corrugated medium
21: Flame-proof corrugated paperboard

The invention claimed is:

1. A flame-proof corrugated paperboard comprising a flame-proof linerboard including:
- a paper layer;
- a flame-proof layer covering a surface of the paper layer, the flame-proof layer containing a flame-proofing agent and a polymer having a molecular weight of 8,000 or more and 10,000,000 or less; and
- an overcoat layer covering a surface of the flame-proof layer to protect the flame-proof layer, the overcoat layer comprising a varnish disposed closer to a surface of the flame-proof corrugated paperboard than is the flame-proof layer.

2. The flame-proof corrugated paperboard according to claim 1, wherein the polymer is a water-soluble polymer.

3. The flame-proof corrugated paperboard according to claim 2, wherein the flame-proofing agent is a water-soluble salt.

4. The flame-proof corrugated paperboard according to claim 1, wherein the varnish is a nitrocellulose-based or acrylic-based varnish.

5. The flame-proof corrugated paperboard according to claim 4, wherein the overcoat layer further comprises an inorganic substance in an amount of 3% by mass or more, and 35% by mass or less of the overcoat layer.

6. The flame-proof corrugated paperboard according to claim 5, wherein the inorganic substance is at least one of an oxide and a metal compound.

7. The flame-proof corrugated paperboard according to claim 1, wherein the overcoat layer further comprises an inorganic substance in an amount of 3% by mass or more, and 35% by mass or less of the overcoat layer.

8. The flame-proof corrugated paperboard according to claim 7, wherein the inorganic substance is at least one of an oxide and a metal compound.

9. The flame-proof corrugated paperboard according to claim 1, wherein the overcoat layer is formed directly on the surface of the flame-proof layer so as to contact the flame-proof layer.

10. The flame-proof corrugated paperboard according to claim 1, wherein the flame-proof layer contains the flame-proofing agent and the polymer in a ratio of the flame-proof agent to the polymer of 0.5 times or more and 10 times or less.

11. The flame-proof corrugated paperboard according to claim 1, wherein an amount of the flame-proofing agent contained in the flame-proof layer is 0.2 $g/m^2$ or more, and 0.7 $g/m^2$ or less.

12. A production method for producing a flame-proof linerboard, the method comprising:
- applying to a first surface of a paper layer of the flame-proof linerboard a coating liquid containing a flame-proofing agent and a polymer having a molecular weight of 8,000 or more and 10,000,000 or less, thereby forming a flame-proof layer; and
- applying an overcoat agent comprising a varnish to a surface of the flame-proof layer on a side of the flame-proof layer opposite from the paper layer, thereby forming an overcoat layer containing the varnish.

13. A production method for producing a flame-proof linerboard, the method comprising:
- applying to a first surface of a paper layer of the flame-proof linerboard a coating liquid containing a flame-proofing agent and a polymer having a molecular weight of 8,000 or more and 10,000,000 or less, thereby forming a flame-proof layer; and
- applying an overcoat agent to a surface of the flame-proof layer on a side of the flame-proof layer opposite from the paper layer, thereby forming an overcoat layer,
- wherein the coating liquid has a viscosity of 20 mPa·s or more and 1,900 mPa·s or less.

* * * * *